United States Patent [19]

Casper et al.

[11] Patent Number: 4,525,561
[45] Date of Patent: Jun. 25, 1985

[54] POLYMERIZING PHENOTHIAZINE STABILIZER CHLOROPRENE IN THE PRESENCE OF AN INITIATOR COMPRISING SODIUM DITHIONATE

[75] Inventors: Rudolf Casper; Peter Wendling, both of Leverkusen; Wolfgang Konter, Neuss; Gottfried Pampus; Gerhard Hohmann, both of Leverkusen, all of Fed. Rep. of Germany

[73] Assignee: Bayer Aktiengesellschaft, Leverkusen, Fed. Rep. of Germany

[21] Appl. No.: 562,418

[22] Filed: Dec. 16, 1983

Related U.S. Application Data

[60] Continuation of Ser. No. 407,124, Aug. 11, 1982, abandoned, which is a division of Ser. No. 234,948, Feb. 17, 1981, abandoned.

[30] Foreign Application Priority Data

Feb. 23, 1980 [DE] Fed. Rep. of Germany ....... 3006802

[51] Int. Cl.$^3$ ............................................ C08F 136/18
[52] U.S. Cl. .................................. 526/220; 526/204; 526/229; 526/234; 526/295
[58] Field of Search ................ 252/428, 440; 526/234, 526/295, 204, 220, 229

[56] References Cited

U.S. PATENT DOCUMENTS

| | | | |
|---|---|---|---|
| 2,494,087 | 1/1950 | Daniels | 260/92.3 |
| 3,378,538 | 4/1968 | Sparks | 526/234 |
| 3,766,121 | 10/1973 | Fichteman | 526/234 |

FOREIGN PATENT DOCUMENTS 1427727  3/1976  United Kingdom .

*Primary Examiner*—Harry Wong, Jr.
*Attorney, Agent, or Firm*—Connolly and Hutz

[57] ABSTRACT

An improved process of polymerizing an aqueous emulsion of chloroprene monomer stabilized with phenothiazine wherein polymerization is initiated in the presence of phenothiazine stabilizer and molecular oxygen with a polymerization initiator comprising sodium dithionite.

3 Claims, No Drawings

POLYMERIZING PHENOTHIAZINE STABILIZER CHLOROPRENE IN THE PRESENCE OF AN INITIATOR COMPRISING SODIUM DITHIONATE

CROSS REFERENCE TO RELATED APPLICATION

This application is a continuation of application Serial No. 407,124 filed Aug. 11, 1982 and now abandoned, which in turn is a division of application Ser. No. 234,948 filed Feb. 17, 1981 and now abandoned.

This invention relates to a polymerisation initiator for the polymerisation of chloroprene, the initiator containing or consisting of sodium dithionite, and its use for the polymerisation of chloroprene which has been stabilized with phenothiazine compounds to polychloroprene in an aqueous emulsion in the presence of oxygen.

It is customary to protect 2-chlorobutadiene (chloroprene) against uncontrolled and premature polymerisation by the addition of stabilizers, for example, phenothiazine.

It is desirable to leave this stabilizer in the monomer during polymerisation as this has considerable advantages. Thus, it eliminates the need to store the resulting unstabilized chloroprene under deep freeze conditions and protect it strictly against access of air, and the risks attendant thereto.

It is known in the art that radical-initiated emulsion polymerisation of chloroprene cannot be started, or only after a long delay, if stabilizers such as phenothiazine are present. Furthermore, even the relatively small fluctuations in the stabilizer content of the monomer, which are technically unavoidable, cause relatively wide fluctuations in the start of polymerisation and uneven progress of polymerisation and hence result in inferior product quality.

It is also known that all radical-initiated polymerisation reactions are powerfully inhibited by traces of molecular oxygen. This has the serious disadvantage in practice that the start of polymerisation is considerably delayed, in the same way as by stabilizers, and substantial fluctuations in the conversion rates occur, with the result that such polymerisation processes are difficult to control on a technical scale. Moreover, these irregularities of polymerisation again lead to fluctuations in the quality of the end product.

It is known to remove molecular oxygen from the polymerisation mixture either by blowing it out or by covering the reaction vessels with purified nitrogen. The main difficulty of this method lies in determining the point in time or the quantity of nitrogen at which the oxygen concentration in the reaction mixture has fallen below the critical value at which it becomes harmless towards polymerisation. Elaborate apparatus, long flushing times and large quantities of purified nitrogen are therefore required for removing the last traces of oxygen.

Inhibition of polymerisation by stabilizers and by molecular oxygen can be checked to a certain extent by using relatively large quantities of initiator but this has the well known disadvantage that the polymer dispersion formed by emulsion polymerisation becomes less stable under conditions of stirring and degasification. Considerable quantities of polymer therefore separate and cake to the walls of the reaction vessels, which again leads to technical difficulties. Furthermore, the higher concentration of radicals in the reaction mixture due to the higher quantity of initiator used entails the risk of stronger branching or cross-linking of the polymer, which again results in an inferior end product.

It is known from the literature that aqueous emulsion polymerisation of many vinyl monomers and diene monomers can be initiated with the aid of so-called redox initiators consisting of alkali metal salts of reducing oxy acids of sulphur such as sodium bisulphate or sodium dithionite or certain amines such as triethanolamine on the one hand and oxidizing agents such as organic peroxides, hydroperoxides, alkali metal salts of peroxy sulphuric acid or of peroxo diphosphoric acid on the other hand (German Offenlegungsschriften Nos. 2 117 751 and 2 462 354, German Pat. No. 926 091, Swiss Pat. No. 248 487, German Pat. No. 968 233 and U.S. Pat. No. 2,614,098). The redox systems described are, however, substantially inhibted by molecular oxygen and/or by numerous stabilizers. For example, the emulsion polymerisation of vinyl chloride activated by sodium dithionite/potassium peroxidisulphate is completely prevented by phenothiazine.

In the system, chloroprene/triethanolamine/potassium peroxodisulphate (see Example 7a), emulsion polymerisation is completely prevented by, for example, 7 mg of molecular oxygen (per liter of aqueous phase).

Formamidine sulphinic acid [FAS] (German Auslegeschrift No. 1 037 689) and certain initiator combinations containing FAS have achieved a position of considerable technical importance for the emulsion polymerisation of chloroprene because they provide the technical advantage of enabling the emulsion polymerisation of phenothiazine stabilized chloroprene to be initiated without previous removal of the stabilizer.

It is a disadvantage of this emulsion polymerisation, however, that it is considerably inhibted by molecular oxygen to an extent depending on the oxygen concentration in the reaction mixture, so that the conversion rates fluctuate and technical difficulties arise, and the quality of the end product is inconsistent.

It has now been found that the aqueous emulsion polymerisation of chloroprene can be started virtually instantaneously and made to proceed very uniformly even at relatively high concentrations of molecular oxygen and in the presence of relatively large quantities of phenothiazine with only a small total quantity of initiator if small quantities of sodium dithionite are added as coactivator to the following initiator systems which are known in the literature for the polymerisation of chloroprene:
  formamidine sulphinic acid (FAS):
  potassium peroxodisulphate;
  FAS/potassium peroxodisulphate;
  potassium peroxodisulphate/anthraquinone-$\beta$-sulphonic acid sodium (U.S. Pat. No. 2,426,854); and
  FAS/potassium peroxodisulphate/anthraquinone-$\beta$-sulphonic acid sodium (German Offenlegungsschirft) No. 2 650 342).
The inhibiting effect of the molecular oxygen on the emulsion polymerisation of chloroprene which has been stabilized with phenothiazine is to a large extent eliminated by the addition of sodium dithionite as coactivator.

It has also been found that the emulsion polymerisation of phenothiazine-stabilized chloroprene can be initiated by sodium dithionite alone, either in the presence or in the complete absence of molecular oxygen.

The sodium dithionite is used in a quantity of from 0.01 to 0.3 parts by weight, preferably from 0.1 to 0.15 parts by weight, based on 100 parts by weight of the monomer to be polymerised.

If mixtures containing sodium dithionite are used as polymerisation initiator, the proportion by weight of the usual initiators to sodium dithionite lies within the range of from 0.05:1 to 5:1 parts by weight, preferably from 0.1:1 to 3:1 parts by weight.

If a mixture of FAS and potassium peroxydisulphate is used as conventional initiator, their proportions by weight to each other are within the range of from 1:10 to 10:1. If a mixture of potassium peroxydisulphate and anthraquinone-$\beta$-sulphonic acid sodium is used, these components may be used in the proportions indicated in U.S. Pat. No. 2 426 854. The proportion by weight of FAS/potassium peroxydisulphate to anthraquinone-$\beta$-sulphonic acid sodium may be varied as in dicated in German Offenlegungsschrift No. 2 650 342.

The emulsifiers used may be any of the usual anionic, cationic, non-ionic or amphoteric surface active compounds, for example, the following:
(a) anionic:
  alkali metal salts of disproportionated abietic acid prepared as described in U.S. Pat. Nos. 2,201,237 and 2,154,629. Alkali metal salts and/or unsaturated $C_6$–$C_{25}$ fatty acids; alkali metal salts of alkylated or non-alkylated naphthalene sulphonic acids condensed with formaldehyde; their preparation has been described by R. S. Barrows and G. W. Scott in Ind. Eng.Chem. 40 (1948) 2193; alkylbenzenesulphates, alkylbenzenesulphonates, alkenolpolyoxyethylate sulphates, alcohol isoethionate, sulphosuccinic acid esters, and alkali metal salts of sulphates of aliphatically alkylated phenols or naphthols.
(b) cationic:
  quaternary ammonium halides and quaternary carboxy methylated ammonium halides.
(c) non-ionic:
  ethylene or propylene adducts of fatty alcohols, fatty acids, fatty acid amides and alkylated or non-alkylated phenols.
(d) amphoteric

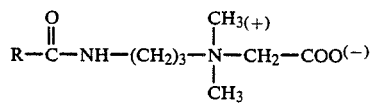

R=alkyl group of a saturated of unsaturated branch chain or straight chain $C_8$–$C_{18}$ fatty acid.

The emulsifiers are used in sufficient quantities, either alone or combined, to ensure a surface active effect. The quantities vary within the order of 2 to 6% by weight, based on the quantity of monomers, depending on the nature of the compounds used, the selected combination of surface active substances and the pH.

Polymerisation may be carried out at temperatures of from 0° to 70° C., preferably of from 0° to 55° C.

The monomers are converted to an extent of from 50 to 99%, depending on the envisaged use of the polymer, conversion rates of from 63 to 70% being indicated for rubbers to achieve advantageous properties for practical application while latices used for strengthening paper or improving bitumen are converted to higher rates, of up to 99%

Chloroprene may be polymerised alone or replaced by up to 60% by weight of some other monomer capable of being copolymerised with chloroprene, e.g. acrylonitrile, methacrylonitrile, α-chloro-acrylonitrile, acrylic acid esters, methacrylic acid esters, vinylidene chloride, styrene, vinyl toluenes, butadiene-(1,3), 1-chlorobutadiene-(1,3), 2,3-dichlorobutadiene-(1,3), 2-chloro-3-methylbutadiene (1,3) and sulphur.

The structure and properties of the polymer can be varied within wide limits by the addition of known compounds used as regulators, e.g. mercaptans, xanthogen disulphides, quinones, benzyl iodide and iodoform.

Unreacted organic compounds can be removed by steam distillation, for example at 50° C. and at an absolute pressure of 20 Torr.

The invention is described in more detail in the following Examples without being restricted to them.

The polymerisation experiments described in the Examples were carried out in a continuously operating vessel in order that specific reaction conditions could be achieved. The average dwell time of the reaction mixture in the stirrer vessel was 60 minutes. Comparison experiments showed that analogous results are obtained both by batchwise operation and when using semicontinuous reaction mixtures (inflow method).

All the experiments were carried out at a temperature of 10° C.

The monomer including a stabilizer and a regulator was pre-emulsified in the aqueous phase containing emulsifiers and caustic soda and then introduced into the reaction vessel into which were also added the aqueous solution(s) of the oxidizing and/or reducing agent and optionally coactivator. Analogous polymerisation results are also obtained without preemulsification.

After discharge from the vessel, the reaction was stopped by the addition of t-butyl-pyrocatechol and diethylhydroxylamine with simultaneous removal of the monomer by evaporation. The conversion rate was in each case determined after 5 dwell times, which correspond to the steady state of the installation.

For comparison, the polymerisation experiments were carried out both while the monomer phase and the major portion of the aqueous phase were saturated with air and when air had previously been blown out and all the reaction solutions were covered with highly purified nitrogen.

Since the examples are only intended to show how chloroprene polymerisation can be initiated, the experiments were stopped prematurely. The conversion rates obtained are therefore low. The desired conversion rates are obtained if polymerisation is carried to completion in known manner. A mixture having the following basic composition was polymerised:

| | |
|---|---|
| Chloroprene | 100 parts by weight |
| n-DDM | 0.13 parts by weight |
| deionised water | 160 parts by weight |
| sodium salt of a disproportionated abietic acid | 5.5 parts by weight |
| caustic soda | 0.77 parts by weight |
| sodium salt of the condensation product of naphthalene sulphonic acid and formaldehyde | 1.0 parts by weight |

The proportions by weight of the other components are shown beside the individual examples in the following table.

TABLE 1

Examples for polymerisation according to the known art

| Example No. | Stabilizer content of the monomer (%) | Initiator System (parts by weight per 100 g of monomer) | | | Conversion rate (%) |
|---|---|---|---|---|---|
| | | Component I | Component II | Component III | |
| 1 a[1] | 0.015 PTZ[5] | 0.02 FAS[2] | — | — | 0 |
| b[1] | " | 0.02 FAS | — | — | 9 |
| 2 a | " | 0.02 FAS | 0.075 PS[3] | — | 0 |
| b | " | 0.02 FAS | 0.075 PS | — | 5 |
| 3 a | " | 0.02 FAS | — | 0.0075 SS[4] | 0 |
| b | " | 0.02 FAS | — | 0.0075 SS | 2 |
| 4 a | " | 0.02 FAS | 0.075 PS | 0.0075 SS | 9 |
| b | " | 0.02 FAS | 0.075 PS | 0.0075 SS | 33 |
| 5 a | " | 0.05 FAS | 0.075 PS | 0.0075 SS | 19 |
| b | " | 0.06 FAS | 0.075 PS | 0.0075 SS | 35 |

| Example No. | Stabilizer content of the monomer (%) | Component I | Component I | Component III | Component IV | Conversion rate (%) |
|---|---|---|---|---|---|---|
| 6 a | 0.015 PTZ[5] | 0.02 FAS | 0.038 Na—bisulphite | 0.075 PS | 0.0075 SS | 14 |
| b | " | 0.02 FAS | 0.038 Na—bisulphite | 0.075 PS | 0.075 SS | 30 |
| 7 a | " | | 0.48 triethanolamine | 0.24 PS | — | 0 |
| 7 b | " | | 0.48 triethanolamine | 0.24 PS | — | 22 |
| 8 b | 0.3 PTZ | | 0.02 FAS | 0.075 PS | 0.0075 SS | 17 |
| 9 b | 0.2 TBC[5] | | 0.02 FAS | 0.075 PS | 0.0075 SS | 0 |

[1] a = saturation with oxygen
b = exclusion of oxygen
[2] FAS = formamidine sulphinic acid
[3] PS = potassium peroxydisulphate
[4] SS = anthraquinone - sulphonic acid sodium ("silver salt")
[5] PTZ = phenothiazine; TBC = t-butyl-pyrocatechol

TABLE 2

Examples for polymerisation with the initiator system according to the invention.

| Example No. | Stabilizer content of the monomer (%) | Initiator system (parts by weight per 100 g of monomer) | | | | Conversion rate (%) |
|---|---|---|---|---|---|---|
| | | Component I | Component II | Component III | Component IV | |
| 10 a | 0.015 | 0.02 FAS | — | — | 0.064 Na—dithionite | 12 |
| b | " | 0.02 FAS | — | — | 0.064 Na—dithionite | 14 |
| 11 a | " | 0.02 FAS | 0.075 PS | — | 0.064 Na—dithionite | 32 |
| b | " | 0.02 FAS | 0.075 PS | — | 0.064 Na—dithionite | 29 |
| 12 a | " | 0.02 FAS | — | 0.0075 SS | 0.064 Na—dithionite | 19 |
| b | " | 0.02 FAS | — | 0.0075 SS | 0.064 Na—dithionite | 19 |
| 13 a | " | 0.02 FAS | 0.075 PS | 0.0075 SS | 0.064 Na—dithionite | 37 |
| b | " | 0.02 FAS | 0.075 PS | 0.0075 SS | 0.064 Na—dithionite | 37 |
| 14 a | " | — | 0.075 PS | — | 0.032 Na—dithionite | 17 |
| 14 b | " | — | 0.075 PS | — | 0.032 Na—dithionite | 30 |
| 15 a | " | — | 0.075 PS | 0.0075 SS | 0.032 Na—dithionite | 24 |
| b | " | — | 0.075 PS | 0.0075 SS | 0.032 Na—dithionite | 31 |
| 16 a | " | — | 0.075 PS | — | 0.064 Na—dithionite | 31 |
| b | " | — | 0.075 PS | — | 0.064 Na—dithionite | 36 |
| 17 a | " | — | 0.075 PS | 0.0075 SS | 0.064 Na—dithionite | 30 |
| b | " | — | 0.075 PS | 0.0075 SS | 0.064 Na—dithionite | 34 |
| 18 a | " | — | — | — | 0.064 Na—dithionite | 3 |
| b | " | — | — | — | 0.064 Na—dithionite | 10 |
| 19 a | 0.3 PTZ | — | 0.075 PS | — | 0.064 Na—dithionite | 27 |
| 20 a | 0.25 TBC | — | 0.075 PS | — | 0.064 Na—dithionite | 3 |

We claim:

1. In the process of polymerizing an aqueous emulsion of chloroprene monomer stabilized with phenothiazine, the improvement wherein said polymerization is initiated in the presence of said stabilizer and molecular oxygen with a polymerization initiator comprising sodium dithionite.

2. A process of claim 1 wherein said initiator comprising a mixture of sodium dithionite and a member selected from the group consisting of (a) formamidine sulphinic acid, (b) potassium peroxydisulphate, (c) formamidine sulphinic acid and potassium peroxydisulphate, (d) potassium peroxydisulphate and anthraquinone-β-sulphonic acid sodium and (e) formamidine sulphinic acid and potassium peroxydisulphate and anthraquinone-β-sulphonic acid sodium, the proportion by weight of said selected member of said group to said sodium dithionite being from 0.05 to 5:1.

3. The process of claim 1 wherein said proportion by weight is from 0.1:1 to 3:1.

* * * * *